United States Patent
Chang

(10) Patent No.: US 6,911,756 B1
(45) Date of Patent: Jun. 28, 2005

(54) ROTOR CORE WITH MAGNETS ON THE OUTER PERIPHERY OF THE CORE HAVING A SINE OR TRAPEZOIDAL WAVE

(76) Inventor: Chio-Sung Chang, 7F-2, No. 351, Dunhua Rd., Beitun District, Taichung City 406 (TW)

( * ) Notice: Subject to any disclaimer, the term of this patent is extended or adjusted under 35 U.S.C. 154(b) by 0 days.

(21) Appl. No.: 10/806,287

(22) Filed: Mar. 23, 2004

(51) Int. Cl.$^7$ .............................................. H02K 21/12
(52) U.S. Cl. ............................................... 310/156.01
(58) Field of Search ................... 310/156.01–156.68, 310/154.36, 40 R, 261, 154, 216, 272

(56) References Cited

U.S. PATENT DOCUMENTS

| | | | | |
|---|---|---|---|---|
| 4,954,736 A | * | 9/1990 | Kawamoto et al. | 310/156.21 |
| 5,023,502 A | * | 6/1991 | Johnson | 310/261 |
| 5,369,325 A | * | 11/1994 | Nagate et al. | 310/156.54 |
| 5,679,995 A | * | 10/1997 | Nagate et al. | 310/156.54 |
| 5,864,191 A | * | 1/1999 | Nagate et al. | 310/156.54 |
| 5,886,440 A | * | 3/1999 | Hasebe et al. | 310/156.19 |
| 5,889,342 A | * | 3/1999 | Hasebe et al. | 310/54 |
| 5,936,322 A | * | 8/1999 | Yamaguchi et al. | 310/156.19 |
| 6,242,837 B1 | * | 6/2001 | Matsunobu et al. | 310/216 |
| 6,353,275 B1 | * | 3/2002 | Nishiyama et al. | 310/156.53 |
| 6,683,397 B2 | * | 1/2004 | Gauthier et al. | 310/68 B |
| 6,707,206 B2 | * | 3/2004 | Chang | 310/156.08 |
| 2002/0047425 A1 | * | 4/2002 | Coupart et al. | 310/156.01 |
| 2002/0047435 A1 | * | 4/2002 | Takahashi et al. | 310/156.56 |
| 2003/0080642 A1 | * | 5/2003 | Mori et al. | 310/156.57 |
| 2004/0017123 A1 | * | 1/2004 | Miyashita et al. | 310/156.53 |

FOREIGN PATENT DOCUMENTS

| | | | | |
|---|---|---|---|---|
| DE | EP 0994550 | * | 4/2000 | H02K/1/27 |
| DE | 10053692 | * | 5/2002 | H02K/1/28 |
| JP | 08009599 | * | 1/1996 | H02K/15/03 |
| JP | 2001-169485 | * | 6/2001 | H02K/1/27 |
| WO | WO-0163726 | * | 2/2001 | H02K/1/28 |

* cited by examiner

*Primary Examiner*—Darren Schuberg
*Assistant Examiner*—Heba Elkassabgi
(74) *Attorney, Agent, or Firm*—Rosenberg, Klein & Lee

(57) ABSTRACT

A rotor for a motor includes a body formed by multiple silicon steel sheets securely abutting one another. Each silicon steel sheet has a series of apertures defined in an outer periphery thereof to define multiple grooves in an outer periphery of the body for receiving a magnetic element. At least one raised portion radially extends from a bottom of each of the aperture to abut a bottom of the magnetic element to form a magnetic field when the rotor is rotated relative to a stator of the motor.

6 Claims, 5 Drawing Sheets

ROTOR CORE WITH MAGNETS ON THE OUTER PERIPHERY OF THE CORE HAVING A SINE OR TRAPEZOIDAL WAVE

BACKGROUND OF THE INVENTION

1. Field of the Invention

The present invention relates to rotor, and more particularly to a rotor for a motor.

2. Description of Related Art

A conventional rotor in accordance with the prior art comprises body formed by multiple silicon steel sheets sequentially securely attached to one another. Each silicon steel sheet has a series of apertures defined therein at equal intervals to longitudinally define multiple grooves in an outer periphery of the body. A magnetic element is longitudinally received in a corresponding one of the multiple grooves in the body. Each magnetic element is glued to the body.

However, the magnetic elements may detach from the body in a high-speed operation when the centrifugal force of the rotating body is greater than the connection between the magnetic elements and the body.

For solving the above problem, another conventional rotor is provided, as shown in FIGS. 8 and 9, and having a body (not shown) by multiple silicon steel sheets (7) securely abutting one another. Each silicon steel sheet (7) has a series of through hole (71) centrally defined therein to define a longitudinal hole in the body for securely receiving a shaft of the motor and multiple cubic holes (72) defined at equal interval near an outer periphery of each of the silicon steel sheet (7) to longitudinally define multiple passage in the body. A magnetic element (8) is longitudinally received in a corresponding one of the passages in the body.

In such a manner, the distance (H1) between the magnetic element (8) and the stator (not numbered) is lengthened. Consequently, the effect of the motor is reduced due to the distance (H1) and the silicon steel sheets (7) between the magnetic element (8) and the stator. Furthermore, the structure of the rotor needs a complicated circuit for providing a sine wave or a trapezoid wave of a magnetic field caused by the rotor and the stator.

The present invention has arisen to mitigate and/or obviate the disadvantages of the conventional rotors for a motor.

SUMMARY OF THE INVENTION

The main objective of the present invention is to provide an improved rotor for a motor. The rotor of the present invention can provide a magnetic field with a sine wave or a trapezoid.

To achieve the objective, the rotor in accordance with the present invention comprises a body formed by multiple silicon steel sheets securely abutting one another. Each silicon steel sheet has a series of apertures defined in an outer periphery thereof to define multiple grooves in an outer periphery of the body for receiving a magnetic element. At least one raised portion radially extends from a bottom of each of the aperture to abut a bottom of the magnetic element.

Further benefits and advantages of the present invention will become apparent after a careful reading of the detailed description with appropriate reference to the accompanying drawings.

DETAILED DESCRIPTION OF THE INVENTION

Figure 1:
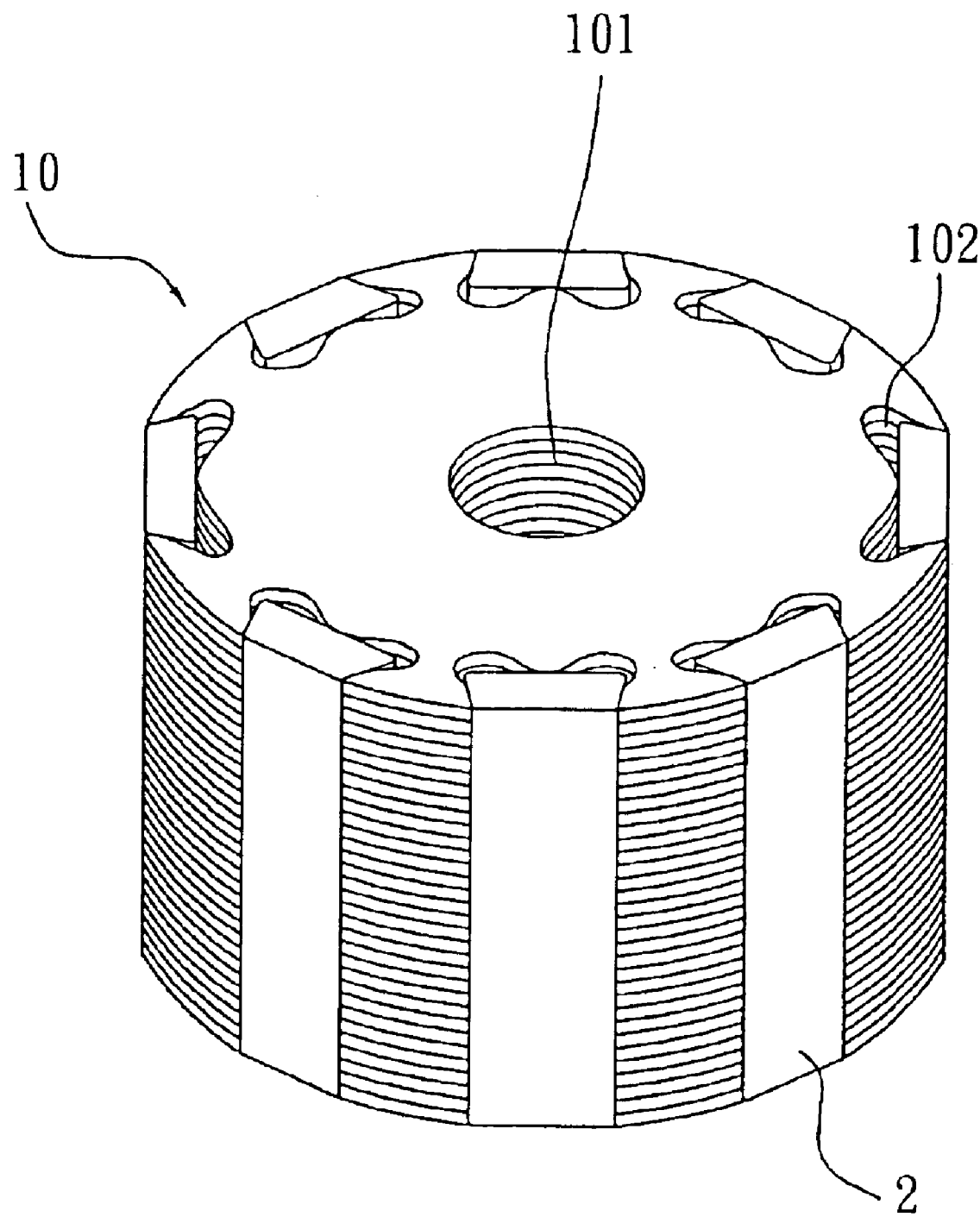
FIG. 1 is a perspective view of a rotor for a motor in accordance with the present invention.
Figure 2:
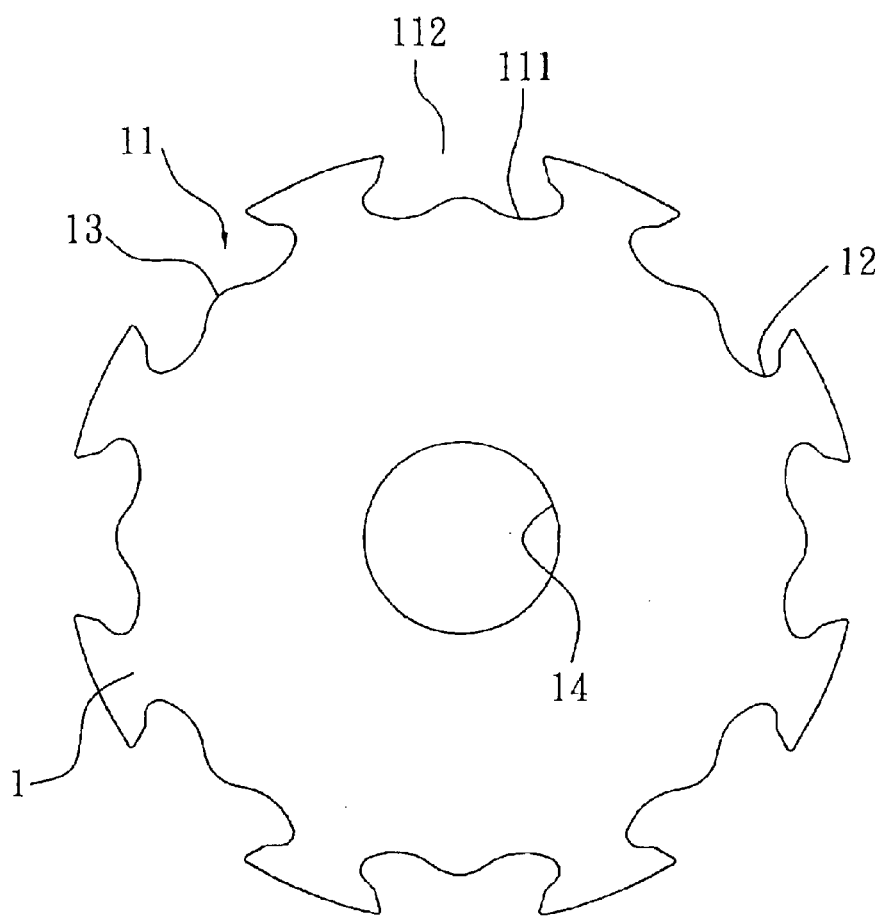
FIG. 2 is a top plan view of a silicon steel sheet of the rotor in FIG. 1.

Referring to the drawings and initially to FIGS. 1–5, a rotor for a motor in accordance with the present invention comprises body (10) formed by multiple silicon steel sheets (1) securely abutting one another. Each silicon steel sheet (1) has a through hole (14) centrally defined therein to define a passage (101) in the body (10) for receiving a shaft (not shown) of the motor and multiple apertures (11) defined in an outer periphery at equal intervals to define multiple grooves (102) in an outer periphery of the body (10). A magnetic element (2) is longitudinally securely received in a corresponding one of the multiple grooves (102) in the body (10). In the preferred embodiment of the present invention, the magnetic element (2) is a permanent magnet. Each aperture (11) has a bottom (111) and an opening (112) defined in the outer periphery of each of the silicon steel sheet (1) opposite to the bottom (111) of the aperture (11). The opening (112) has a width narrower than that of the bottom (111) and centrally corresponds to the bottom (111). Two concave portions (12) are respectively defined in two opposite ends of the bottom (111) of each of the apertures (11) and laterally extend relative to each other to centrally form a raised portion (13) on the bottom (111) of each of the apertures (11) in each silicon steel sheets (1). The raised portion (13) abuts a bottom of the magnetic element (2) when the magnetic element (2) is received in the groove (102) in the body (10).

The opening (112) is slightly widened and the silicon steel sheets (1) provide a clamping force to each magnetic element (2) when the magnetic element (2) is laterally inserted into a corresponding one of the grooves (102) in the body (10). The magnetic element (2) has a trapezoid cross-section corresponding to the bottom (111) and the opening (112) of each of the apertures (11) so that the magnetic elements (2) should not be detached from the rotor (10) due to the centrifugal force of the operating rotor (10).

Figure 4:
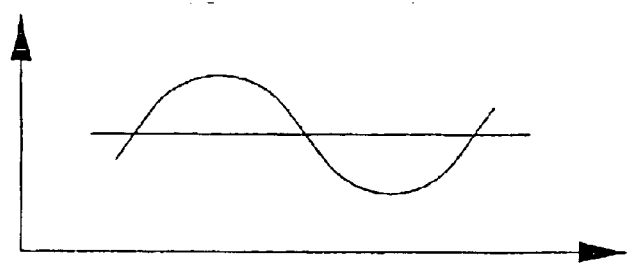
FIG. 4 is a waveform chart of the rotator, in FIG. 1 when operating, that shows a sine wave.

The stator (4) of the motor is an electromagnet. Consequently, a magnetic field is formed and has a sine wave due to the two concave portions (12) in the bottom (111) of each of the apertures (11), as shown in FIG. 4, when the rotor (10) is rotated relative to the stator (4). The magnetic field with a sine wave has the characteristics as follow: easily started, having a small starting electric current and precisely positioned. Consequently, the magnetic field with a sine wave can be used to equipments having a complicated drive circuit, such as a precise machine-tool and national defense industry, or control an angle of a precise valve.

Figure 3:
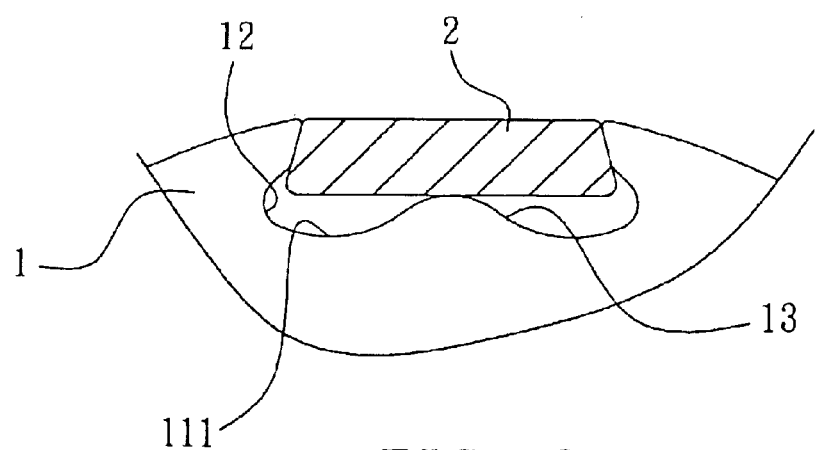
FIG. 3 is a partially top plan view of the rotor in FIG. 1.
Figure 5:
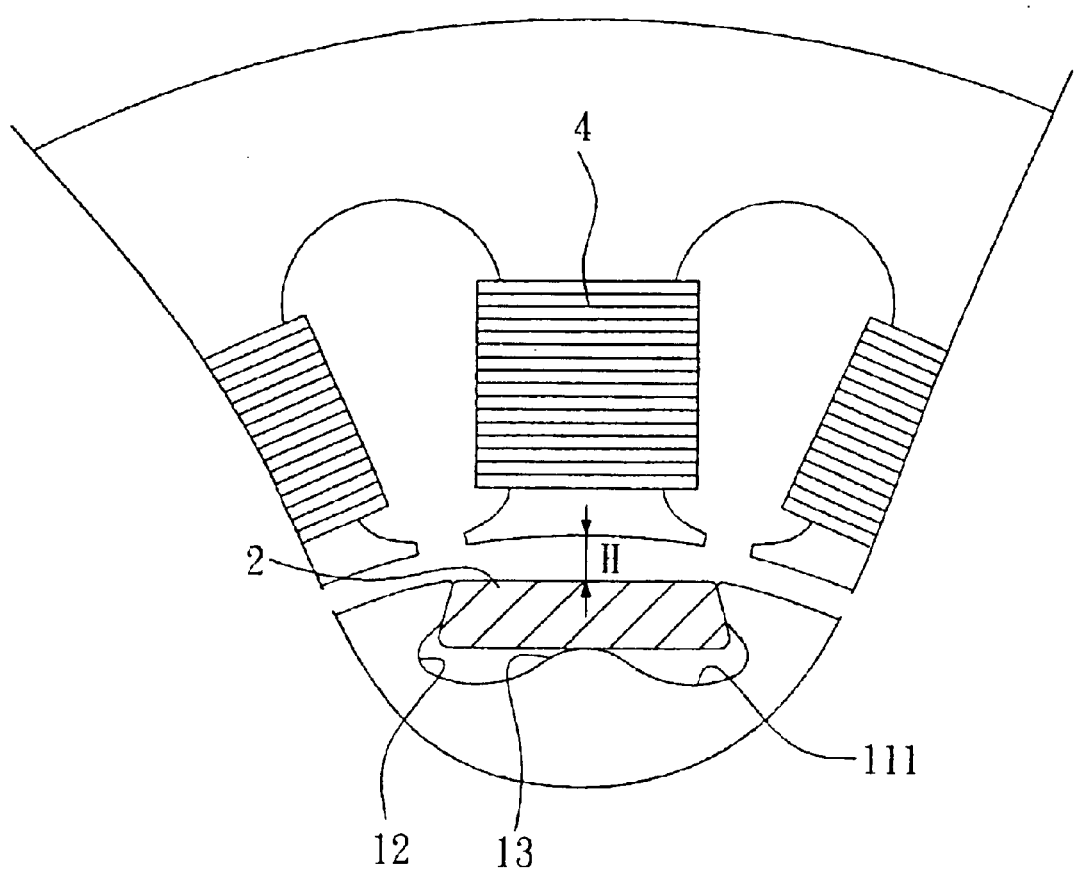
FIG. 5 is a partially operational top plan view of the rotor in FIG. 1.

With reference to FIGS. 3 and 5, the magnetic element (2) is mounted on the outer periphery of the body (10) so that the distance (H) between the magnetic element (2) and the stator (4) is shortened and the effect of the motor is promoted.

Figure 6:
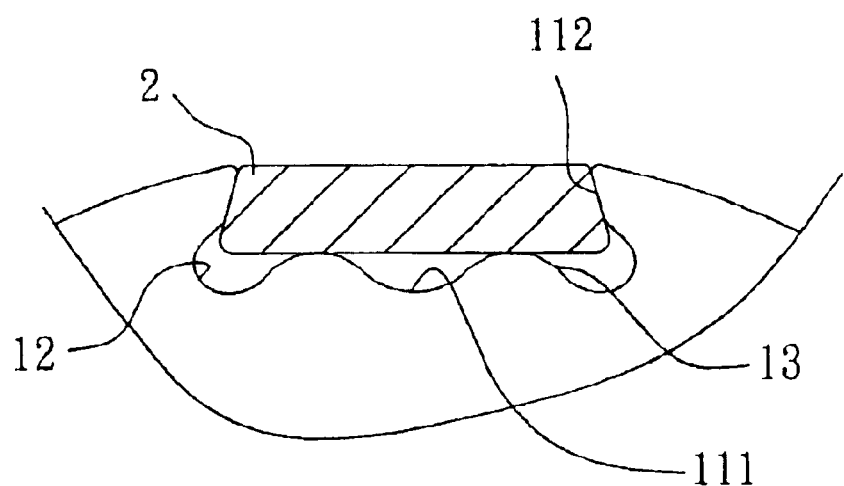
FIG. 6 is a top plan view of a second embodiment of the aperture in the silicon steel sheet in accordance with the present invention.
Figure 7:
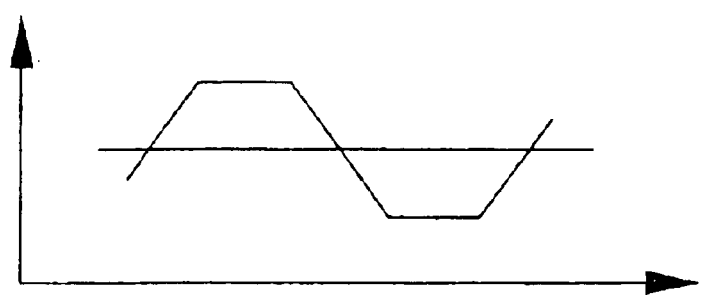
FIG. 7 is a waveform chart of an operational rotor that is formed by the silicon steel sheet in FIG. 6.
Figure 8:
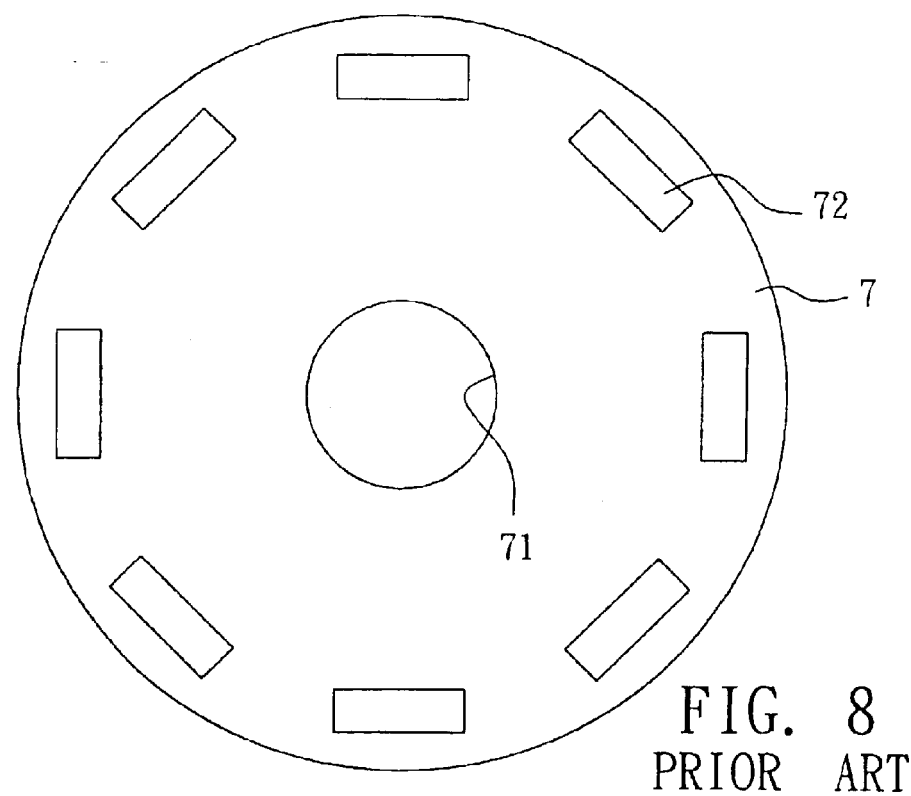
FIG. 8 is a top plan view of a conventional silicon steel sheet of a rotor for a motor in accordance with the present invention.
Figure 9:
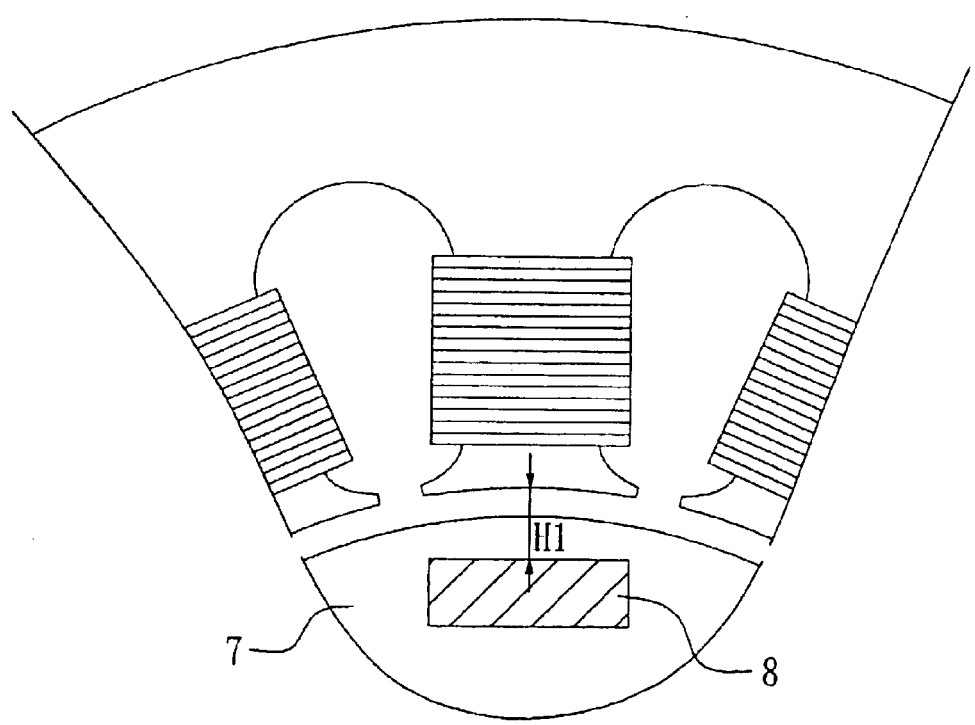
FIG. 9 is a partially operational view of the rotor formed by the conventional silicon steel sheet in FIG. 8.

With reference to FIGS. 6 and 7 show a second embodiment of the silicon steel sheet (1) in accordance with the present invention, there are two raised portions (13) extending from the bottom (111) of each of the apertures (11) toward the opening (112) and equally divide the bottom (111) into three portions. The two raised portions (13) abut a bottom of the magnetic element (2) when the magnetic element (2) is received in the groove (102) of the body (10).

A magnetic field is formed and has a trapezoid wave due to the two raised portions (13) extending from the bottom (111) of each of the apertures (11), as shown in rig. 6, when the rotor (10) is rotated. The magnetic field with a trapezoid wave can promote the start torsion or enhance the torsion in time. Consequently, the magnetic field with a trapezoid wave can be used to an electric vehicle having a heavy load of a hoist.

Although the invention has been explained in relation to its preferred embodiment, it is to be understood that many other possible modifications and variations can be made without departing from the spirit and scope of the invention as hereinafter claimed.

What is claimed is:

1. A rotor for a motor, comprising a body formed by multiple silicon steel sheets securely abutting one another, each silicon steel sheet having a through hole centrally defined therein to define a passage in the body for receiving a shaft of the motor and multiple apertures defined in an outer periphery thereof at equal intervals to define multiple grooves in an outer periphery of the body, a magnet element longitudinally securely received in a corresponding one of the multiple grooves in the body, each aperture having a bottom and an opening defined in the outer periphery of each of the silicon steel sheets opposite to the bottom of the aperture, the opening having a width narrower than that of the bottom and centrally corresponding to the bottom, a raised portion having an arcuate contour and extending from the bottom of each of the apertures in each of the silicon steel sheets toward the opening, the raised portion abutting a bottom of the magnetic element when the magnetic element is received in the groove in the body for forming a magnetic field with a sine wave due to the rotating rotor, wherein two concave portions are respectively defined in two opposite ends of the bottom of each of the apertures and extend radially and circumferentially to the raised portion centrally located between the two opposite ends.

2. The rotor as claimed in claim 1, wherein the magnetic element is a permanent magnet.

3. A rotor for a motor, comprising a body formed by multiple silicon steel sheets securely abutting one another, each silicon steel sheet having a through hole centrally defined therein to define a passage in the body for receiving a shaft of the motor and multiple apertures defined in an outer periphery thereof at equal intervals to define multiple grooves in an outer periphery of the body, a magnet element longitudinally securely received in a corresponding one of the multiple grooves in the body, each aperture having a bottom and an opening defined in the outer periphery of each of the silicon steel sheets opposite to the bottom of the aperture, the opening having a width narrower than that of the bottom and centrally corresponding to the bottom, two raised portions extending from the bottom of each of the apertures in each of the silicon steel sheets toward the opening to equally divide the bottom of each of the apertures into three portions, the two raised portions abutting a bottom of the magnetic element when the magnetic element is received in the groove in the body for forming a magnetic field with a trapezoid wave due to the rotating rotor.

4. The rotor as claimed in claim 3, wherein the magnetic element is a permanent magnet.

5. The rotor as claimed in claim 3, wherein two concave portions are respectively defined in two opposite ends of the bottom of each of the apertures and laterally extend relative to each other to centrally the raised portion.

6. The rotor as claimed in claim 4, wherein two concave portions are respectively defined in two opposite ends of the bottom of each of the apertures and laterally extend relative to each other to centrally the raised portion.

* * * * *